United States Patent
Rogers et al.

[11] Patent Number: 5,928,300
[45] Date of Patent: Jul. 27, 1999

[54] THREE-AXIS AIRCRAFT CRASH SENSING SYSTEM

[75] Inventors: Jon P. Rogers, Tempe; Lindley W. Bark, Chandler, both of Ariz.

[73] Assignee: Simula Inc., Phoenix, Ariz.

[21] Appl. No.: 08/960,861

[22] Filed: Oct. 30, 1997

[51] Int. Cl.$^6$ .................................................. G06F 17/00
[52] U.S. Cl. ........................ 701/45; 701/46; 280/728.1; 280/734; 180/268; 180/271; 340/436
[58] Field of Search .................. 701/45, 46, 47, 701/49; 340/436, 686, 689; 280/727, 728.1, 734, 735; 180/268, 271, 282

[56] References Cited

U.S. PATENT DOCUMENTS

| | | | |
|---|---|---|---|
| 5,320,382 | 6/1994 | Goldstein et al. | 280/735 |
| 5,538,099 | 7/1996 | Blackburn et al. | 180/282 |
| 5,610,575 | 3/1997 | Gioutsos | 701/45 |
| 5,684,336 | 11/1997 | McCurdy | 180/282 |
| 5,779,264 | 7/1998 | De Mersseman et al. | 701/45 |
| 5,809,439 | 9/1998 | Damisch | 701/45 |
| 5,835,007 | 11/1998 | Kosiak | 340/436 |

Primary Examiner—William A. Cuchlinski, Jr.
Assistant Examiner—Gertrude Arthur
Attorney, Agent, or Firm—Crowell & Moring LLP

[57] ABSTRACT

An electronic crash sensing unit for detecting and discriminating a crash and actuating occupant safety device(s) such as air bags. The unit is designed and constructed to operate within an aircraft, but may be used in ground and sea-going vehicles as well. It provides crash acceleration sensing coverage for impact angles occurring throughout aircraft upper and lower hemispherical directions, which are defined by longitudinal, lateral, and vertical aircraft fixed axes as well as any combination of coordinates thereof. It can sense an aircraft acceleration event, determine if the acceleration is a normally occurring event not requiring air bag deployment or a crash event that warrants deployment. The crash sensing unit uses a microprocessor and algorithm to discriminate crash events that warrant safety device deployment from non-crash events, and to actuate deployment. The crash sensing unit compares continuously measured acceleration and calculated total velocity change to defined go/no-go threshold criteria. A crash event is defined as the exceeding both acceleration and velocity change thresholds.

40 Claims, 7 Drawing Sheets

THREE-AXIS AIRCRAFT CRASH SENSING SYSTEM

BACKGROUND

FIELD OF THE INVENTION

The present invention relates to systems for triggering the deployment of safety devices used in aircraft and, more particularly, to an electronic system that compares current specific conditions with programmed thresholds that indicate a crash event and require deployment of safety devices such as air bags.

BACKGROUND OF THE INVENTION

Various systems for actuating automotive safety systems are well known in the art. Such systems are used to sense frontal and lateral impacts, and, in response to such conditions, to actuate an air bag, lock a seat belt, or actuate a pretensioner for a seat belt retractor. Automotive sensors are primarily designed for crash detection along the longitudinal axis only, and are programmed to process relatively short duration crash impulses. Conventional vehicle crash discrimination systems also typically employ at least one acceleration sensor affixed to the vehicle for sensing vehicle acceleration. The sensor's output is supplied to a crash discrimination circuit that determines at least one crash measure, such as a value for vehicle velocity through integration of the sensor's output over time, for subsequent comparison to a predetermined threshold value. If the predetermined threshold value is exceeded, the discrimination circuit outputs a trigger signal that actuates a passenger safety restraint, such as an air bag or passive seat belt pretensioning mechanism.

Aircraft crash events are distinctly different from automotive crash events; therefore, crash sensors developed for automotive use are inadequate for aircraft use. In comparison to automobiles, aircraft, and especially rotorcraft, crash in a great variety of attitudes and directions. Also, the structural response to impact is very different in different directions. Aircraft typically crash with a vertical as well as a forward velocity component, and there may be lateral velocity and angular velocities about all axes as well. Aircraft crashes frequently involve several very severe impacts. For example, helicopters often roll and experience a side impact after the initial impact. Additionally, the use of energy-absorbing landing gear on some military aircraft creates very asymmetric crash pulses, which can add to the complexity of crash determination.

Aircraft crash detection systems need to be appreciably more sophisticated than automotive crash detection systems. For an automobile, a primarily single-axis sensor may be adequate for sensing forward impacts. However, for helicopters, and perhaps for all aircraft, the crash detection system should be capable of sensing a multiaxis impact and processing long duration crash pulses. Ideally, it should respond with the proper sensitivity throughout a hemisphere representing all possible impact attitudes with any combination of forward, lateral, and downward velocities. Components for aircraft have stringent environmental test requirements, which include high- and low-temperature, humidity, salt, fog, vibration, and EMI (electromagnetic interference) testing. Further, all components and cables must be protected from electrostatic discharges with shielding. The system must also be designed to avoid inadvertent activation under high levels of vibration caused by severe maneuvers; turbulence; hard landings; and, for military aircraft, gunfire, and missile or rocket launching.

Protective air bag systems have been investigated for aircraft application for many years; however, no system has ever been used aboard an operation aircraft. Yet, crash injury data for U.S. Army aircraft show a serious need for enhanced occupant protection, and an inflatable restraint system that is actuated by a crash detection system that is designed specifically for aircraft is a viable means of providing such protection.

SUMMARY OF THE INVENTION

The present invention is an aircraft electronic unit capable of sensing an aircraft crash and actuating an occupant safety device or devices. The crash sensing unit provides crash acceleration sensing coverage for impact angles occurring throughout aircraft upper and lower hemispherical directions. The upper and lower hemispheres are defined by longitudinal, lateral, and vertical aircraft fixed axes as well as any combination of coordinates thereof. The invention comprises means to sense an aircraft acceleration event, to determine if the acceleration is a normally occurring event not requiring air bag deployment, or a mild crash not requiring deployment, or a crash event that warrants air bag deployment, to discharge electrical impulses for actuating the air bags during a crash event, to protect against inadvertent actuation of the air bags during normal flight operation, to self-test to assess system health and readiness, and to record significant event and crash data for future review and analysis.

To provide optimal system flexibility and reliability, the present invention uses an array of micromachined solid-state accelerometers, which sense local aircraft accelerations along each of three orthogonal axes, and a programmable microcontroller to perform crash discrimination, air bag actuation, and system diagnostic checking. Further, the present invention complies with world-wide aviation EMI/ESD/EMV/EMC requirements. This compliance and especially its programmability are key features that make the crash sensing unit potentially compatible with and effective aboard virtually any aircraft.

Software algorithms for system-health monitoring and crash discrimination control the operation of the invention. The system-health monitoring algorithm detects any system fault during a self-test sequence. The crash discrimination algorithm monitors measured accelerations, transformed to aircraft fixed axes, for instances in which go/no go acceleration thresholds have been exceeded. Should an acceleration threshold be exceeded, the algorithm begins calculation of the resulting velocity change. A crash event is defined as exceeding both the acceleration and velocity change thresholds. A "go" command for air bag deployment is issued if both acceleration and velocity change thresholds are exceeded. The crash discrimination algorithm includes a sliding integration window, parabolic threshold criteria, and necessary associated reset features. It works for any aircraft crash pulse, regardless of its direction, shape or duration, and distinguishes between crash and non-crash conditions for any impact angle.

Accordingly, it is an object of the present invention to detect an aircraft crash.

It is an object of the present invention to sense multiaxis impacts and process long duration crash pulses.

It is a further object of the present invention to discriminate a normally occurring event or a mild crash not requiring a deployment of a safety device from a crash event that warrants deployment.

It is another object of the present invention to discharge electrical impulses for actuating air bags or other safety device(s) during a crash event.

It is another object of the present invention to prohibit inadvertent actuation of air bags or other safety device(s) during normal flight operation.

It is another object of the present invention to self-test to assess the entire occupant safety system's electronic health and readiness.

It is another object of the present invention to record significant event and crash data for future review and analysis.

It is another object of the present invention to provide a crash sensing unit that complies with world-wide EMI/ESD/EMV/EMC requirements.

It is another object of the present invention to provide a crash sensing unit that it is compatible with and effective aboard any aircraft.

These and other objects of the present invention are described in greater detail in the detailed description and the appended drawings.

DETAILED DESCRIPTION OF THE INVENTION

Figure 1:
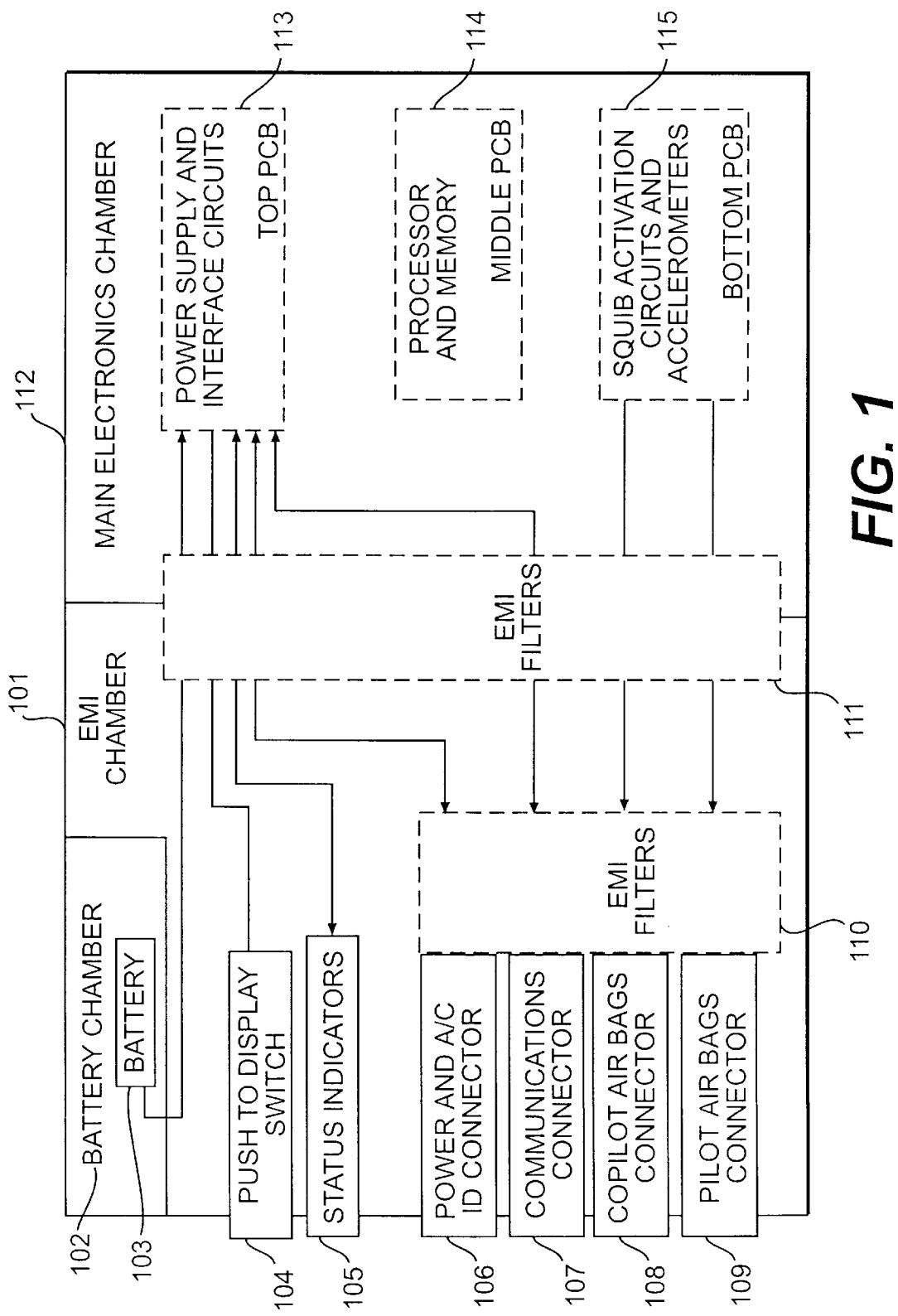
FIG. 1 schematically illustrates the primary components of the crash sensing unit and their general position within the unit.
Figure 2:
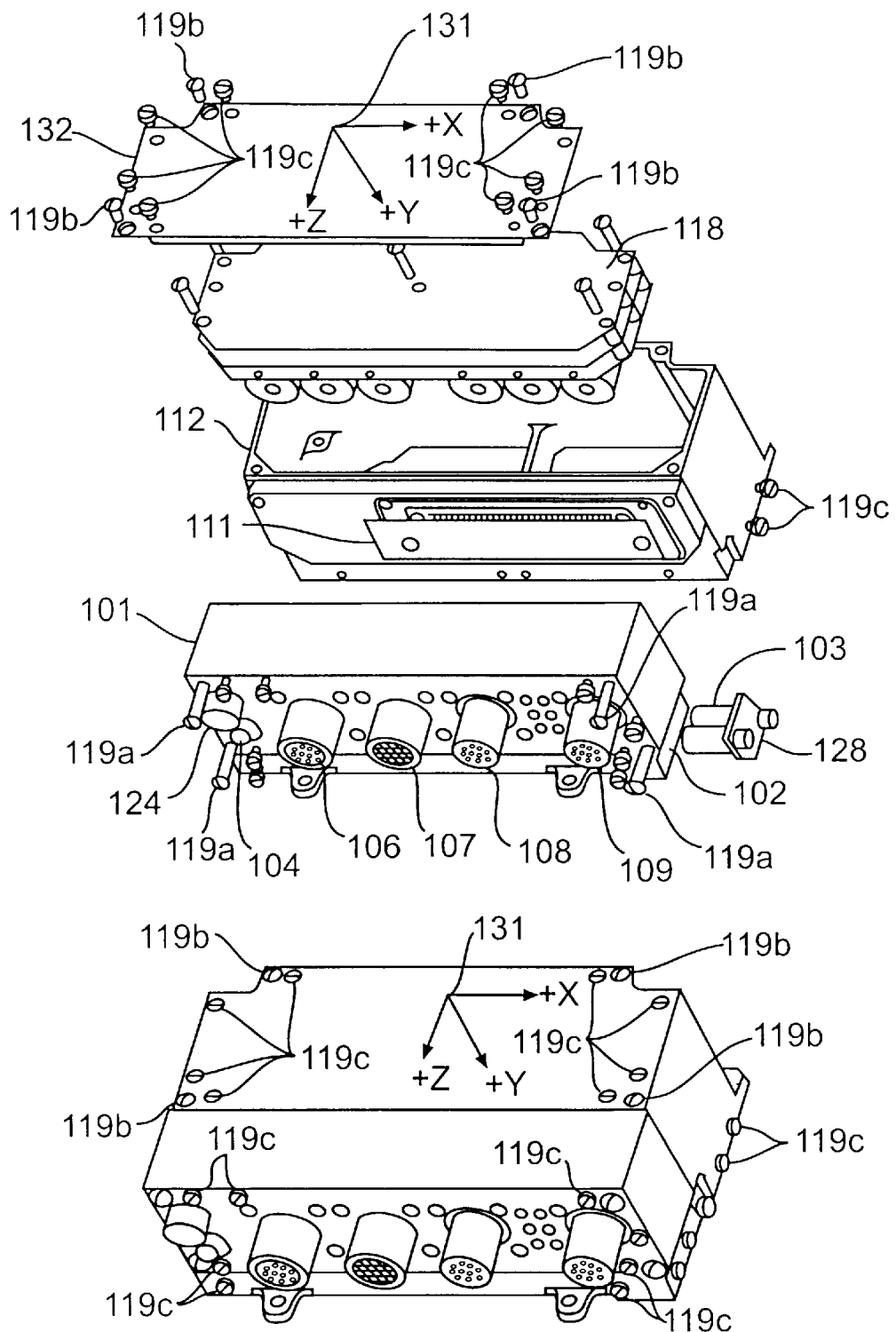
FIG. 2 shows isometric and exploded views of the crash sensing unit.
Figure 3:
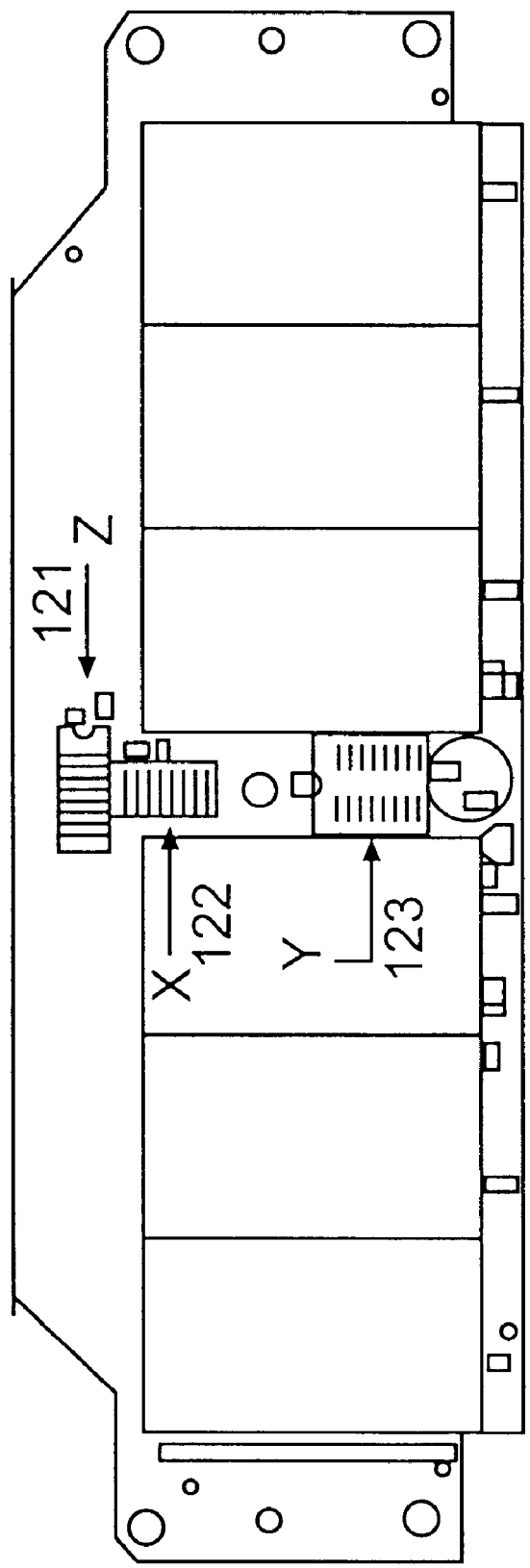
FIG. 3 shows the location of the X-, Y-, and Z-axis accelerometers mounted to the bottom PCB within the crash sensing unit.
Figure 4:
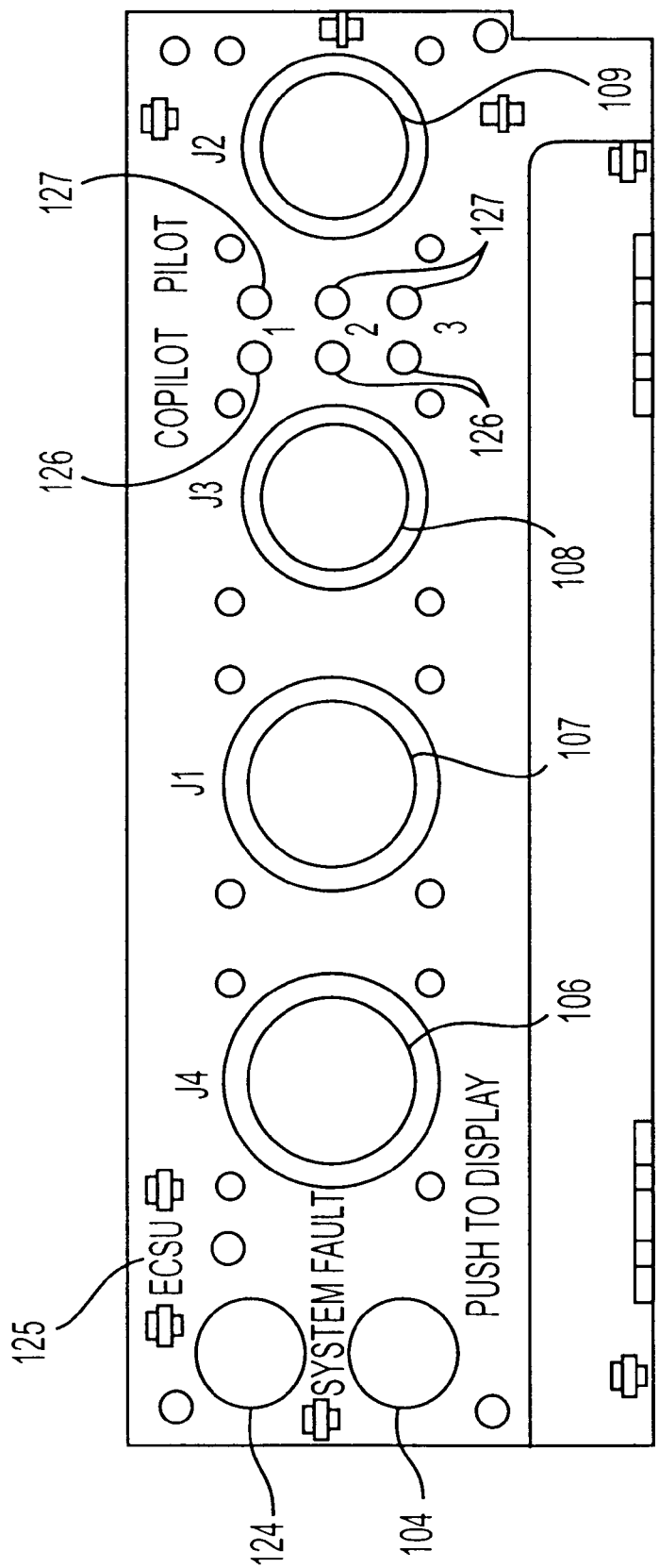
FIG. 4 shows the front view of the crash sensing unit.

A preferred embodiment of the present invention is shown in FIGS. 1 through 4. FIG. 1 schematically shows the positioning of the invention's main components. FIGS. 2 through 4 show the general placement and shape of the main components of the crash sensing unit.

FIG. 1 shows that the present invention is partitioned by EMI filter 111 (e.g., Murata model no. 2743021447) into two main chambers, the EMI chamber 101 and the main electronic chamber 112. The EMI chamber 101 contains a battery chamber 102 with battery 103 (e.g., Panasonic model no. P234-L052-ND), push-to-display switch 104 (e.g. model no. P7-300077, Otto Controls, Carpentersville, Ill.), status indicators 105 (e.g., LEDs), power and A/C ID connector 106, communications connector 107, copilot air bags connector 108, pilot air bags connector 109, and EMI filters 110 (e.g., Murata model no. 2743021447).

The crash sensing unit contains a power filter circuit. Preferably, the crash sensing unit's steady-state operation is 22.0 to 29.0 volts. The primary power source for the crash sensing unit is the aircraft's on-board 28 volt dc power source. However, the unit's battery 103 internally provides a redundant power source to actuate the air bags and perform data recording in the event of aircraft primary power source failure. The preferred embodiment of the present invention is capable of actuating air bags for up to five seconds after loss of primary aircraft power. Additionally, the crash sensing unit is capable of electrically actuating six pyrotechnic air bag initiators; however, growth provisions may be made for additional initiators, if required, through the use of reserved external pins. Furthermore, the unit may be used to activate other safety devices such as restraint pretensioners or possibly flotation devices. The total time required to apply required firing currents to all six initiators is a maximum of 0.001 seconds. For safety during maintenance handling operations, an internal mechanism is included to rapidly bleed-off residual stored energy to help preclude actuation after power is removed (beyond five seconds from power disconnect). The crash sensing unit is also capable of data recording for up to 60 seconds after loss of primary aircraft power.

The main electronics chamber 112 contains three stacked printed circuit boards (PCB). The top PCB 113 contains power supply and interface circuits; the second PCB 114 holds a microprocessor and memory; and the third PCB 115 holds squib activation circuits and three accelerometers.

The preferred embodiment of the present invention utilizes a 32 bit, floating point, 40 MHz digital signal microprocessor (not shown; e.g., Texas Instruments model no. TMS320C31) to perform crash discrimination, system health and readiness monitoring, and interface control with external aircraft systems. The crash sensing unit is designed and configured to allow future processing growth and expansion for independent control and sequencing of multiple aircraft safety systems and advanced algorithms. The crash sensing unit of the present invention can be customized to any of up to 64 different configurations. More configurations are possible using a more powerful microprocessor. This growth and expansion is possible because the embodiment of the crash sensing unit described herein does not require the use of the unit's full processing capability. Independent control and sequencing allow the unit to trigger different safety systems at different times during the crash event.

Flash RAM memory records, for future review, the system health and readiness time history data, significant event acceleration time history data, the number of aircraft start-ups occurring after a significant event, and crash acceleration time history data. Data recording may also be accomplished by serial upload from nonvolatile RAM. This information can be downloaded to a standard external processing device for review and analysis.

In accordance with the present invention, a significant event is defined as exceeding an acceleration threshold. Preferably, a minimum of 60 seconds of longitudinal, lateral, and vertical acceleration time history data is recorded for a significant event. With the 60-second window, 40 seconds of data occurs before the acceleration threshold is exceeded and the remaining 20 seconds of data occurs after the acceleration threshold is exceeded. Additionally, the microprocessor counts and retains in memory the number of aircraft start-ups occurring after a significant event, data which may be downloaded via a data interface. This feature is used to estimated when a significant event might have occurred.

A crash event, in accordance with the present invention, is defined as exceeding both the acceleration and velocity change thresholds. The microprocessor issues a "go" command for air bag employment if both acceleration and velocity change thresholds are exceeded. Preferably, a minimum of 60 seconds of longitudinal, lateral, and vertical acceleration time history data is recorded for a crash event. Within this 60-second window, 40 seconds of data occurs before the "go" command and 20 seconds of data occurs after the "go" command.

To prevent an unnecessary deployment, the crash sensing unit has a built-in interface and capability to override an air bag deployment command based on an input to the unit from a remotely located occupant position sensor. The remote sensor interfaces with the microprocessor and, depending on the input from the remote sensor, the microprocessor may override its own go command. The remote sensor may, for example, be a switch which is manually operated to override the go command.

The exploded view in FIG. 2 illustrates the assembly of the present invention and, as with FIG. 1, shows the partitioning of the crash sensing unit. The EMI chamber 101 comprises the front of the unit, and the Built-In Test (BIT) cylinder 124 (e.g., model no. MI51LP-5-W/BLK-TT manufactured by Electrodynamics, Inc., Rolling Meadows, Ill.), push-to-display switch 104, power and A/C ID connector 106, communications connector 107, copilot air bags connector 108, and pilot air bags connector 109. The battery compartment 102 is located on the underside of the EMI housing 101 and contains the battery pack 103 and is covered by battery cover 128. The unit's main chamber 112 is mechanically attached via four screws 119a to the back of the EMI chamber 101. EMI filters 111 are attached to the front of the main chamber 112 and are, therefore, positioned between the EMI chamber 101 and the main chamber 112. EMI chamber 101 is electromagnetically shielded, to protect sensitive components in the chamber from potentially harmful electromagnetic environments. As is shown in FIG. 2, a PCB stack assembly 118 is positioned within the main chamber 112. The stack assembly, from top to bottom, holds the power supply and interface circuits 113, microprocessor and memory 114, and squib activation circuits and accelerometers 118. The squib activation circuits are electronic circuits which activate the gas generators. These circuits have to provide relatively high currents for short time periods, which burn a bridge wire, which then ignites the gas generator. For example, the squib activation circuits may include capacitors, which store the necessary charge required to supply the high current needed to burn the bridge wire. The crash sensing unit's top plate 132 mechanically fastens to the top of the main chamber 112 via four screws 119b. Nylon drain screws 119c are used in the unit's assembly and installation to allow for water and condensation drainage. Reference arrows 131 indicating the orientation of the X, Y, and Z axes in relation to the unit are marked on the top of the top plate 132.

The crash sensing unit is designed and constructed to be compatible with aircraft and world-wide EMI/ESD/EMV/EMC requirements. For example, the unit may be housed in an aluminum enclosure with overall dimensions (including mounting provisions) of 7.13 inches in length, 4.85 inches in width, and 2.75 inches in height, weighing, e.g., no more than 2.65 pounds.

The present invention provides crash acceleration sensing coverage for impact angles occurring throughout aircraft upper and lower hemispherical directions. The upper and lower hemispheres are defined by longitudinal, lateral, and vertical aircraft fixed axes as well as any combination of coordinates thereof. An override cone angle feature is included for each of the six primary axis directions. The cone angles are programmable zones, or vectors, which constitute "black out" zones. The sensing unit does not respond to acceleration and velocity changes which result from occurrences in these zones. Override cones along each of the six primary axis directions (forward, aft, left, right, up, and down) allow air bag deployment to be inhibited. The capability to independently turn the overrides on or off for each direction, as well as change the cone angles, is included as programmable inputs. A "go" or "fire" command is overridden and deployment prohibited for impact conditions occurring with an active override cone.

Miniature semiconductor-type accelerometers (e.g., model no. 3255-050, IC Sensors, Milpitas, Calif.) are used to continuously sense local aircraft accelerations along each of three orthogonal axes. The accelerometers are permanently installed in the crash sensing unit. FIG. 3 shows the positioning of the X, Y, and Z accelerometers (122, 123, and 121, respectively). The three accelerometers are mounted to the bottom of the bottom PCB 115. In relation to the unit, the X-axis accelerometer 122 is mounted vertically, and the Z-axis accelerometer 121 is mounted orthogonally to the X-accelerometer 122. The Y-axis accelerometer 123 is mounted horizontally in relation to the crash sensing unit.

Crash discrimination processing is performed with respect to aircraft fixed axes, which are defined by the fuselage station, butt line, and water line system. The crash sensing unit's fixed axes are defined with respect to the unit's accelerometers. The present invention uses a transformation of axes approach to account for varying mounting orientations required by different aircraft platforms. In this manner, accelerations sensed in the unit's fixed axes are transformed to aircraft fixed axes during processing. To allow for commonality, transformation coefficients are reprogrammable.

Figure 5:
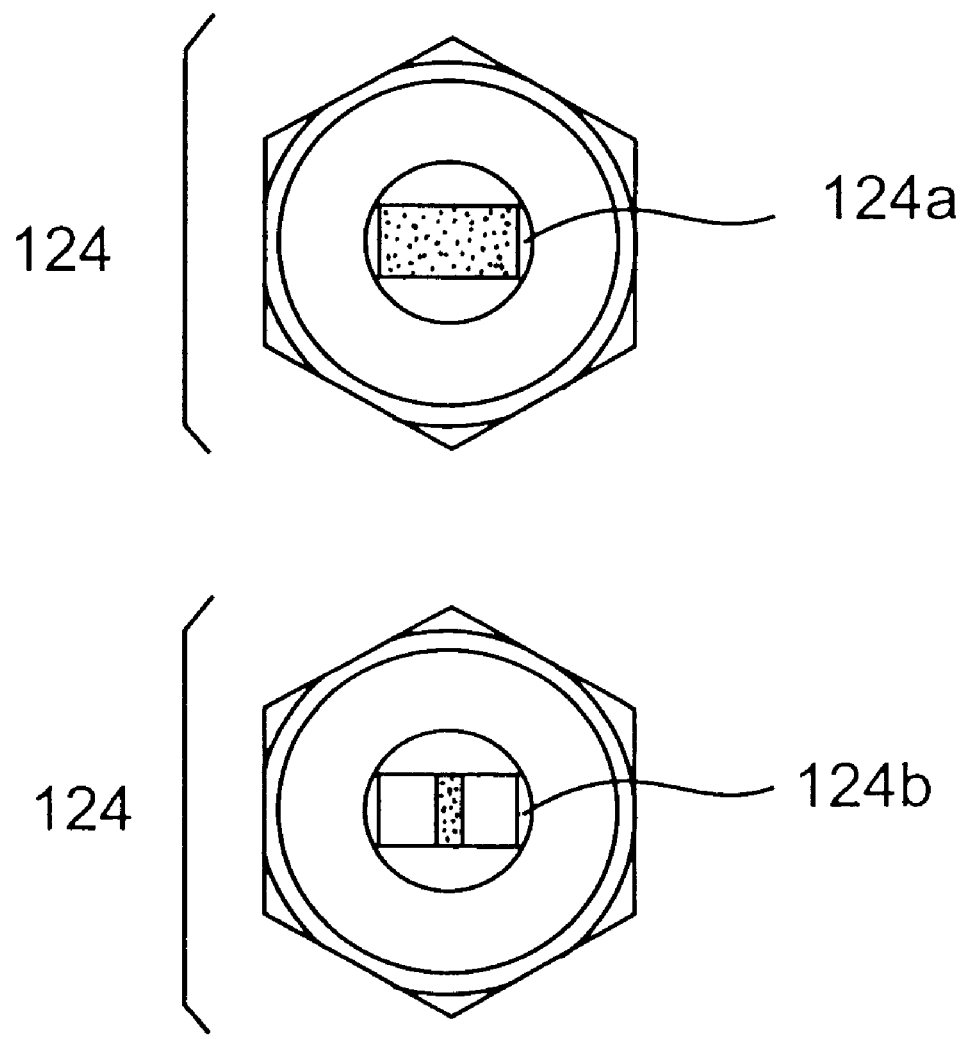
FIG. 5 shows the front view of the crash sensing unit's fault indicator in both no fault indicated and fault indicated modes.

FIG. 4 shows the crash sensing unit's fault indicators. The unit provides a means for automatic system self-test and fault isolation. Self-test is automatically performed at regular intervals during operation of the unit, commencing at aircraft power-up. A quick-look, non-LED, go/no-go type fault indicator 124 (such as a BIT indicator) is used to display the overall operational self-test status. FIG. 5 shows the fault indicator 124 as it appears when no fault is indicated 124a and as it appears when a fault is detected and indicated 124b. The quick-look indicator 124 displays a go/no-go situation upon detection of any system fault during the self-test sequence. Should the quick-look indicator 124 display (a no-go situation twin white squares), fault isolation and troubleshooting can be manually initiated via a push-to-display button 104 and LED display(s) capable of isolating faults to a single line-replaceable-unit (LRU). Seven LEDs are used to indicate system status/fault detection. Of these, three LEDs are pilot air bag fault indicators 127, three are copilot air bag fault indicators 126, and one LED is the crash sensing unit fault indicator 125.

The present invention has built-in capability, in terms of electronics and connectors, to interface with a remotely mounted quick-look type fault indicator such as a BIT-ball. (A BIT-ball is used to display visual information without emitting light, for example by mechanically rotating a ball from showing a black surface to showing a white surface.) Input and output provisions are included for future growth and interface with additional aircraft systems.

The present invention has the capability to record, for future review, the system health and readiness time history data, significant event acceleration time history data, the number of aircraft start-ups occurring after a significant event, and crash acceleration time history data. System health monitoring occurs in three intervals: during power-up, continuous power-on, and power-down. This subsystem monitors itself and the airbag system for electrical abnormalities. The information it collects can be downloaded to a standard external processing device for review and analysis.

Crash discrimination and air bag actuation is controlled by the present invention's crash discrimination algorithm. This algorithm monitors measured accelerations, transformed to aircraft fixed axes, to determine whether go/no-go criteria acceleration thresholds have been exceeded. Should an acceleration threshold be exceeded, the algorithm begins calculation of the resulting velocity change. Velocity change, with respect to aircraft fixed axes, is calculated by numerical integration of the measured accelerations. The total velocity change is formed by continuous summation of the incremental velocity change calculated over each numerical integration time step. If the event duration extends beyond the initial time window, the algorithm additionally uses a sliding window routine to calculate the total velocity change. Analysis windows are 0.100 seconds in length. A go command, causing air bag activation, occurs if a go/no-go criteria total velocity change threshold is exceeded.

Go/no-go criteria are relative to aircraft fixed axes and defined in terms of acceleration and total velocity change thresholds. Go/no-go threshold criteria represent those crash events that warrant deployment of the air bags. Combinations of acceleration and total velocity change that are equal to or greater than the defined go/no-go criteria values cause the crash sensing unit to actuate the air bag initiators. The crash sensing unit will not actuate the initiators for combinations of acceleration and total velocity change that are less than or equal to the defined go/no-go criteria values.

The present invention could be implemented using on-axis crash sensing, i.e. independent crash-sensing along the x-axis, the y-axis and the z-axis, or using off-axis crash sensing.

On-Axis Crash Sensing

For a crash occurring while the aircraft is traveling in the forward direction, the following are examples of go/no-go criteria with respect to the longitudinal aircraft fixed axis:
  Acceleration Threshold: −3.5 g
  Total Velocity Change Threshold: −3.0 ft/sec For a crash occurring while the aircraft is traveling in aft, the following are examples of go/no-go criteria with respect to the longitudinal aircraft fixed axis:
  Acceleration Threshold: +3.5 g
  Total Velocity Change Threshold: +2.0 ft/sec For a crash occurring while the aircraft is traveling in the right-lateral direction, the following are examples of go/no-go criteria with respect to the lateral aircraft fixed axis:
  Acceleration Threshold: −3.5 g
  Total Velocity Change Threshold: −2.0 ft/sec For a crash occurring while the aircraft is traveling in the left-lateral direction, the following are examples of go/no-go criteria with respect to the lateral aircraft fixed axis:
  Acceleration Threshold: +3.5 g
  Total Velocity Change Threshold: +2.0 ft/sec For a crash occurring while the aircraft is traveling in the vertical downward direction, the following are examples of go/no-go criteria with respect to the vertical aircraft fixed axis:
  Acceleration Threshold: +5.0 g
  Total Velocity Change Threshold: +15.0 ft/sec For a crash occurring while the aircraft is traveling in the vertical upward direction (represented by an inverted crash), the following are examples of go/no-go criteria with respect to the vertical aircraft fixed axis:
  Acceleration Threshold: −4.0 g
  Total Velocity Change Threshold: −6.0 ft/sec Off-Axis Crash Sensing The present invention can also be designed to use the defined longitudinal, lateral, and vertical go/no-go threshold criteria to determine go/no-go threshold criteria for the full range of upper and lower hemispherical off-axis crash conditions. In that case, both acceleration and velocity change go/no-go criteria are represented as three-dimensional ellipsoidal functions to determine appropriate acceleration and go/no-go thresholds for off-axis acceleration inputs. It would be apparent to those skilled in the art that different threshold criteria can be used for different implementation of the present invention.

For off-axis crash sensing, the off-axis acceleration threshold is exceeded whenever $$\left(\frac{a_x}{a_x^{th}}\right)^{n_x} + \left(\frac{a_y}{a_y^{th}}\right)^{n_y} + \left(\frac{a_z}{a_z^{th}}\right)^{n_z} \geq 1.0$$

where $a_x$, $a_y$ and $a_z$ are the accelerations in the x, y and z directions, respectively;
  $a_x^{th}$, $a_y^{th}$ and $a_z^{th}$ are the acceleration thresholds in the x, y and z directions, respectively; and
  $n_x$, $n_y$ and $n_z$ are the acceleration exponents in the x, y and z directions respectively.

The acceleration threshold values provided above for on-axis crash sensing, 3.5 g to 5.0 g, are typical examples for off-axis crash sensing acceleration threshold values. The acceleration exponents are typically all 2's, i.e., $n_x=n_y=n_z=2$. However, if one direction is particularly important for a specific application (e.g., the vertical or z-axis for a helicopter), it could be assigned a higher exponent (e.g., $n_x=n_y=2$, and $N_z=5$). Conversely, if one direction is less important than others, its contribution could be de-emphasized by assigning it a lower exponent, e.g., 1.5 or 1.0 for that axis, and 2.0 for the other axes.

For off-axis crash sensing, the total velocity change threshold is exceeded whenever $$\left(\frac{\Delta V_x}{\Delta V_x^{th}}\right)^{m_x} + \left(\frac{\Delta V_y}{\Delta V_y^{th}}\right)^{m_y} + \left(\frac{\Delta V_z}{\Delta V_z^{th}}\right)^{m_z} \geq 1.0$$

where $\Delta V_x$, $\Delta V_y$ and $\Delta V_z$ are the total velocity changes in the x, y and z directions, respectively;
  $\Delta V_x^{th}$, $\Delta V_y^{th}$ and $\Delta V_z^{th}$ are the velocity change thresholds in the x, y and z directions, respectively; and
  $m_x$, $m_y$ and $m_z$ are the velocity change exponents in the x, y and z directions, respectively. The velocity change exponents are generally equal to their respective acceleration exponents, but they do not have to be equal.

Reset parameters

Algorithm reset parameters are used to reduce susceptibility of the crash sensing unit to inadvertent actuation. The lower reset time limit is used to prevent inadvertent actuation of the air bags due to high magnitude/short duration acceleration events such as a tool drop near the crash sensing unit. The crash sensing unit will not activate if a go command is reached before the lower reset time limit; instead, the unit will reset. The lower reset time limit is 0.005 seconds.

Once the sliding window integration procedure is initiated, it remains active until a total velocity change threshold is exceeded and air bag deployment is initiated, or a total velocity change threshold has not been exceeded, nor has the acceleration threshold been exceeded over the prior analysis window duration (0.100 seconds). If an acceleration threshold has not been exceeded within the last 0.100 seconds, the sliding window integration continues. If, after the first window, the acceleration threshold has not been exceeded within the last 0.100 seconds, the crash sensing unit resets.

Crash Sensing Algorithm

Figure 6:
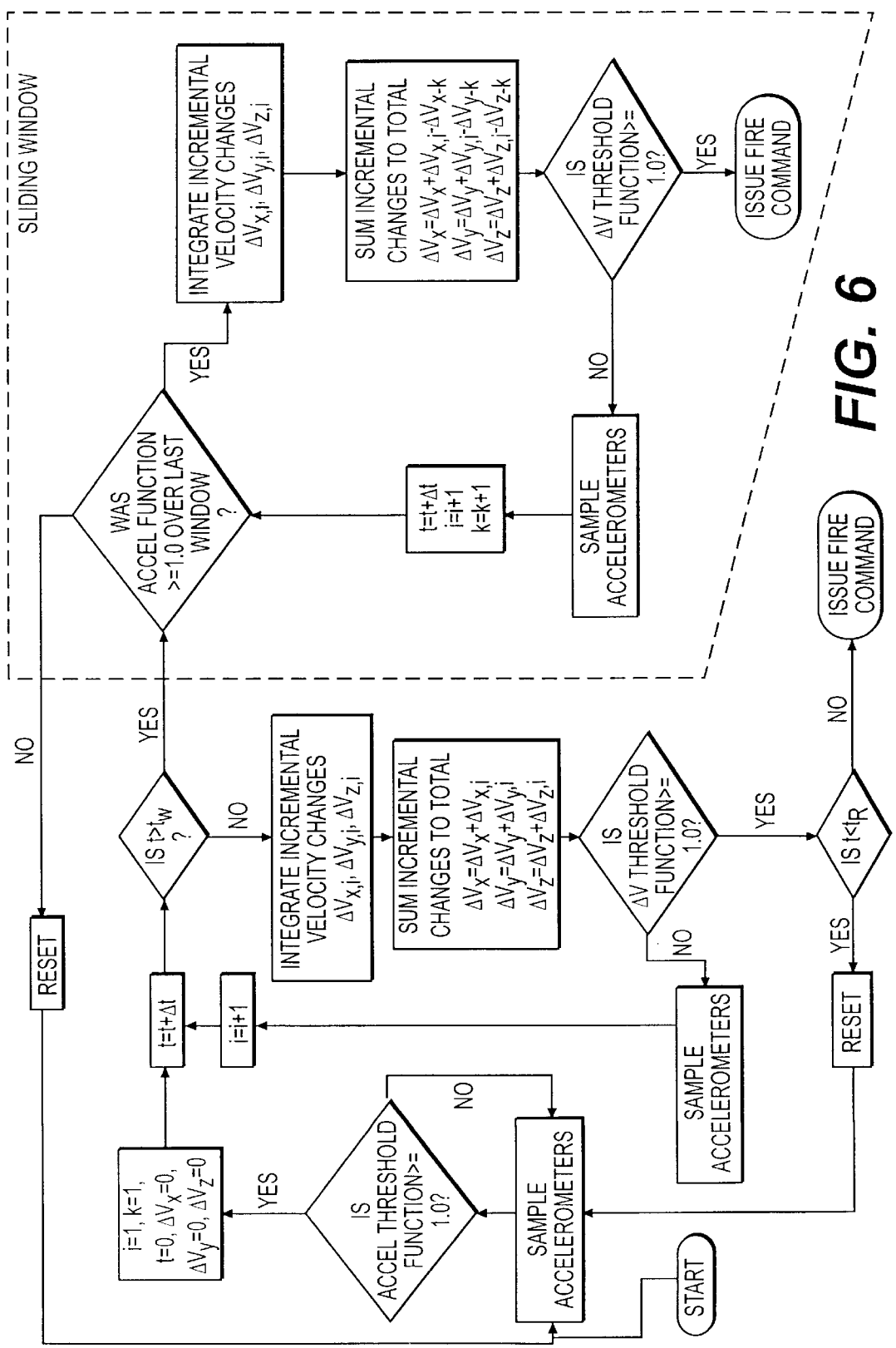
FIG. 6 is a flow chart that identifies the steps of the crash discrimination and air bag actuation algorithm that controls the crash sensing unit.

FIG. 6 is a flow chart that depicts the control process, or algorithm, employed by the crash sensing unit's microprocessor to detect and discriminate a crash and actuate the safe device(s). This algorithm comprises the following steps:

1. Controller receives data representative of measured accelerations.
2. Controller compares this data to a programmed acceleration threshold.
3. If the input is not greater than the threshold, no actuation occurs, and the controller evaluates the next input.
4. If the input is greater than the threshold, the controller initializes counters for time and total velocity change.
5. The controller initiates the next sample.
6. The controller compares the event time with the duration of the time window.
7. If the event time is not greater than the time window, then the controller calculates incremental velocity change.
8. System stores current sampling of velocity integration increment.
9. Controller calculates total velocity change where total velocity change equals velocity change plus first velocity change.
10. Controller compares total velocity change to programmed velocity change threshold.
11. If total velocity change is greater, the controller compares the event time to the lower reset time limit.
12. If the event time is greater than the lower reset time limit, then actuation occurs.
13. If the event time is not greater than the lower reset time, then actuation does not occur, and the total velocity change resets to 0.
14. If in step 10 the controller finds that the total velocity change is not greater than the programmed velocity change threshold, then the time increment counter resets to previous value plus 1 and the process repeats beginning at step 5.
15. If the event time is greater than the time window, as determined in step 6, the controller determines if the acceleration threshold has been exceeded over the last (previous) time window.
16. If the threshold exceedence occurred over the last window, the controller moves the input into the sliding window routine and calculates incremental velocity change. This step is illustrated in the second diagram from the left, in the top set of diagrams in FIG. 7.
17. System stores current sampling of velocity integration increment.
18. Using the incremental velocity change, the controller calculates total velocity change, where total velocity change equals velocity change plus current velocity change minus first velocity change. This step is also illustrated in the second diagram from the left, in the top set of diagrams in FIG. 7.
19. The controller compares total velocity change to programmed velocity change threshold.
20. If the total velocity change is greater than the threshold, the safety system is actuated. This step is illustrated in the last diagram (showing "GO" in a bubble) on the bottom set of diagrams in FIG. 7.
21. If the velocity change is not greater than the velocity threshold, then counters are reset to previous values plus 1, and the controller returns to step 15.
22. If the acceleration threshold was not exceeded over the last window, as determined in step 15, total velocity change is reset to 0, and the controller begins the process again at step 1.

Figure 7:
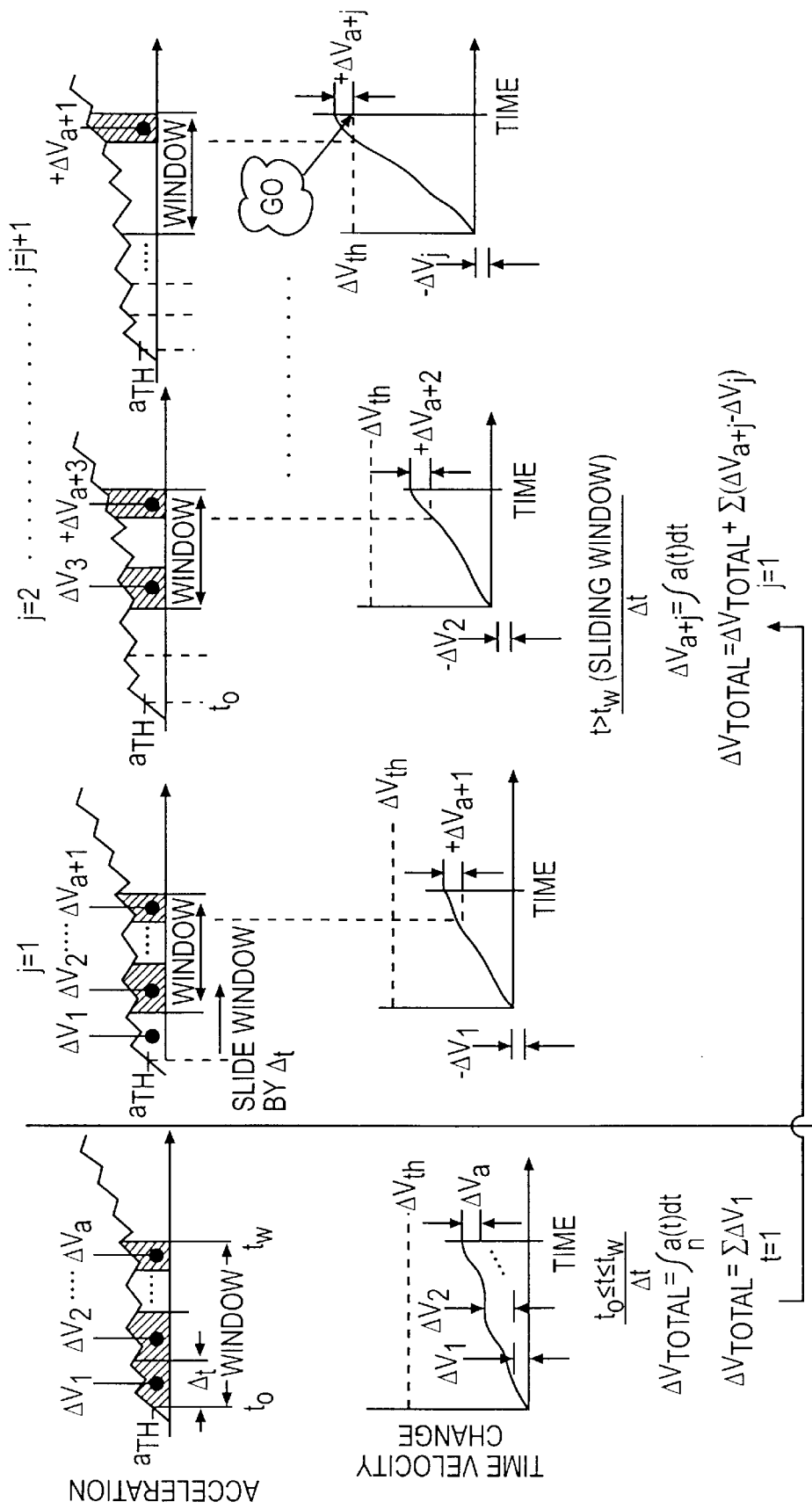
FIG. 7 illustrates the sliding window routine of the crash discrimination and air bag actuation algorithm that controls the crash sensing unit.

FIG. 7 depicts the sliding window routine employed in the crash discrimination algorithm. This routine is detailed in steps 16 through 21 above.

To allow for commonality over a wide variety of aircraft types, some of the crash sensing unit's software characteristics are reprogrammable. The programmable characteristics are as follows:

1. Algorithm acceleration integration thresholds.
2. Algorithm velocity change go/no-go thresholds.
3. Algorithm lower reset time limit.
4. Crash sensing unit-to-aircraft axes transformation coefficients.
5. Deployment override cone angles for each of the six primary axis directions (on/off selector and cone angle with respect to this axis).
6. Integration window time duration.

The crash sensing unit should be mounted on or at least very near to major structural members near the occupants. Mounting the sensor on stiff structural members eliminates structural resonance which might perturb the sensor. It may also eliminate the need for the safing sensor which is routinely included in almost all auto crash sensor systems. The safing sensor is a secondary sensor—generally placed at a different location on the vehicle than the crash sensing unit—which is used to "safe" or "arm" the air bag system. The air bag will not deploy without a fire signal (or a "GO" signal) from both the safing sensor and the crash sensing unit. Safing sensors are used when a single sensor alone cannot discriminate in certain situations. In comparatively small airframes, there should be relatively continuous major structure between the sensor mounting location and likely impact points. For example, on an attack helicopter, the major load-bearing structure between the landing gear and high overhead masses is a preferred location. It is reasonably close to the crew compartment, and high accelerations will be quickly experienced at such a location in the case of a vertical impact with the ground.

Careful placement of the crash sensing unit is also necessary for proper timing of an inflatable restraint system. As in automotive systems, a different type of sensor may be required for different areas of aircraft. Some are designed for use in an area which crushes, and others are for an area which does not. Since aircraft structures may have greater variations in size and stiffness than do automotive structures, the design and placement of the crash sensor is more complex. In larger aircraft, such as transports, more emphasis should be placed on locating the sensor near the occupants to be protected by the air bags, but major structural components should still be selected to ensure that the air bags will not be activated too late, and to minimize the effects of shock and vibration occurring in non-crash situations. For example, in a fixed-wing transport, longitudinal beams under the floor are a good choice.

The foregoing disclosure of the present invention has been presented for the purposes of illustration and description. It is not intended to be exhaustive or to limit the invention to the precise forms disclosed. In particular, the present invention can be used in ground and sea vehicles as well as aircraft. Many variations and modifications of the invention described herein will be obvious to one of ordinary skill in the art in light of the above disclosure. For example, the safety system or device(s) actuated by the crash sensing unit of the present invention may be an air bag, a seat belt, or a pretensioner for a seat belt retractor. The scope of the invention is to be defined only by the claims appended hereto, and by their equivalents.

What is claimed is:

1. A three-axis aircraft crash sensing system comprising:
   (a) an x-axis solid-state accelerometer;
   (b) a y-axis solid-state accelerometer mounted orthogonally to the x-axis solid-state accelerometer;
   (c) a z-axis solid-state accelerometer mounted orthogonally to the x-axis and y-axis solid-state accelerometers;
   (d) a microprocessor and one or more ignition circuits;
   (e) one or more air bags; and
   (f) one or more gas generators, each of said gas generators comprising an igniter, wherein each igniter is electrically connected to an ignition circuit,
   wherein said gas generators are capable of fully inflating all of the one or more air bags,
   wherein each of the accelerometers continuously measures acceleration in its respective direction, and provides signals representative of the acceleration to the microprocessor,
   wherein the microprocessor calculates an x-axis total velocity change, a y-axis total velocity change and a z-axis total velocity change from the signals representative of the acceleration,
   wherein the microprocessor contains an x-axis total velocity change threshold, an x-axis acceleration threshold, a y-axis total velocity change threshold, a y-axis acceleration threshold, a z-axis total velocity change threshold and a z-axis acceleration threshold,
   and wherein the microprocessor is programmed to issue a command to the ignition circuit to initiate ignition of one or more igniters if:
   (i) the x-axis acceleration is greater than the x-axis acceleration threshold and the x-axis total velocity change is greater than the x-axis total velocity change threshold, or
   (ii) the y-axis acceleration is greater than the y-axis acceleration threshold and the y-axis total velocity change is greater than the y-axis total velocity change threshold, or
   (iii) the z-axis acceleration is greater than the z-axis acceleration threshold and the z-axis total velocity change is greater than the z-axis total velocity change threshold.

2. The three-axis crash sensing system of claim 1, further comprising a flash RAM memory for recording time history data for each of the accelerometers for a predetermined period.

3. The three-axis crash sensing system of claim 1, wherein the crash sensing system is mounted in an enclosure having an EMI chamber and a main electronic chamber, said EMI chamber housing connectors electrically connecting the ignition circuits to the igniters, and said main electronic chamber housing the x-axis, y-axis and z-axis accelerometers.

4. The three-axis crash sensing system of claim 3, wherein the EMI chamber also houses a battery, said battery electrically connected to provide back-up power to the microprocessor and to the ignition circuits.

5. The three-axis crash sensing system of claim 1, wherein the acceleration and total velocity change thresholds are programmable.

6. A method for detecting crashes comprising:
   (a) providing a programmable controller and three solid-state accelerometers which are mounted in mutually orthogonal directions;
   (b) continually receiving three sets of signals at the programmable controller from each of the three orthogonally-mounted solid-state accelerometers, each one of said set of signals representing the acceleration respectively experienced by one of the three solid-state accelerometers;
   (c) comparing the acceleration measured by each of the three solid-state accelerometers to its respective acceleration threshold;
   (d) returning to step (b) if the acceleration is determined to be not greater than the respective acceleration threshold for each of the three accelerometers;
   (e) initializing a counter for time and a counter for total velocity change for each of the accelerometers for which the respective acceleration threshold was exceeded, if the acceleration is determined to be greater than the respective acceleration threshold for one or more of the three accelerometers;
   (f) calculating the incremental velocity change;
   (g) calculating the total velocity change by adding the incremental velocity change to a sum of all previously calculated incremental velocity changes within a predetermined time period, if any;
   (h) comparing the total velocity change to a threshold velocity change threshold;
   (i) if the total velocity change is greater than the threshold velocity change for any of the three accelerometers, igniting an ignition circuit which initiates generation of gas for inflating air bags; and
   (j) if the total velocity change is not greater than the threshold velocity change for any of the three accelerometers, returning to step (b).

7. The method of claim 6, further comprising recording time history data for each of the accelerometers for the predetermined time period.

8. The method of claim 6, further comprising the following additional steps between steps (h) and (i):
   calculating the time each of the accelerometers has been experiencing acceleration greater than its respective threshold acceleration as an event time,
   comparing the event time to a predetermined time limit for each of the accelerometers,
   if the event time is not greater than the predetermined time limit for any of the accelerometers, returning to step (b),
   if the event time is greater than the predetermined time limit, going on to step (i).

9. The method of claim 6, further comprising, the following additional steps between steps (g) and (h):
   calculating the time each of the accelerometers has been experiencing acceleration greater than its respective threshold acceleration as an event time,
   comparing the event time to a predetermined time window for each of the accelerometers, if the event time is greater than the predetermined time window for all of the accelerometers, going on to step (h), if the event time is not greater than the predetermined time window, determining whether the acceleration threshold was exceeded in a time window just prior to the present time window, if the respective acceleration threshold was not exceeded in the time window just prior to the present time window, returning to step (b), if the respective acceleration threshold was exceeded in the time window prior to the present time window, going on to step (h).

10. The method of claim 6, further comprising recording and retaining in memory the number of aircraft start-ups occurring after any one of the three acceleration thresholds has been exceeded.

11. A three-axis crash sensing unit comprising:
(a) three accelerometers mounted orthogonally to each other on a printed circuit board;
(b) a microprocessor in communication with each of the accelerometers;
(c) ignition circuits electrically connected to the programmable controllers; and
(d) a flash RAM memory,
wherein the microprocessor receives signals representative of the acceleration experienced by each of the three accelerometers, and (1) compares the acceleration to a predetermined acceleration threshold for each of the three accelerometers, (2) calculates the total velocity change over a predetermined time period, and compares the total velocity change to a predetermined threshold total velocity change, and (3) if both the acceleration threshold and the total velocity change threshold are exceeded, initiates operation of the ignition circuits,
and wherein time history data for each of the accelerometers for the predetermined time period is recorded in the flash RAM memory.

12. The three-axis crash sensing unit of claim 11, wherein the crash sensing unit is mounted in an enclosure having an EMI chamber and a main electronic chamber, said EMI chamber housing connectors for electrically connecting the ignition circuits to igniters.

13. The three-axis crash sensing system of claim 12, wherein the EMI chamber also houses a battery, said battery electrically connected to provide back-up power to the microprocessor and to the ignition circuits.

14. The three-axis crash sensing system of claim 11, further comprising means for recording and retaining in memory the number of aircraft start-ups occurring after any one of the acceleration thresholds has been exceeded.

15. The three-axis crash sensing system of claim 11, wherein the microprocessor comprises means for selecting programmable zones for which air bag deployment can be inhibited.

16. A three-axis crash sensing system comprising:
(a) means for selecting a forward acceleration threshold, an aft acceleration threshold, an up acceleration threshold, a down acceleration threshold, a left acceleration threshold and a right acceleration threshold;
(b) means for selecting a forward total velocity change threshold, an aft total velocity change threshold, an up total velocity change threshold, a down total velocity change threshold, a left total velocity change threshold and a right total velocity change threshold;
(c) means for detecting forward acceleration, aft acceleration, up acceleration, down acceleration, left acceleration and right acceleration;
(d) means for calculating total velocity changes over a predetermined time period for the forward, aft, up, down, left and right directions from the detected respective forward, aft, up, down, left and right accelerations;
(e) means for comparing the detected forward, aft, up, down, left and right accelerations to the respective forward, aft, up, down, left and right acceleration thresholds;
(f) means for comparing the calculated forward, aft, up, down, left and right total velocity changes to the respective forward, aft, up, down, left and right total velocity change thresholds; and
(g) means for determining whether air bags should be deployed based on the comparisons of the respective accelerations to the respective acceleration thresholds, and the comparisons of the respective total velocity changes to the respective total velocity change thresholds.

17. The three-axis crash sensing system of claim 16, further comprising means for recording and retaining in memory the number of aircraft start-ups occurring after any one of the acceleration thresholds has been exceeded.

18. The three-axis crash sensing system of claim 16, further comprising means for selecting programmable zones for which air bag deployment can be inhibited.

19. The three-axis crash sensing system of claim 16, wherein the absolute value of the up and down acceleration thresholds are significantly different.

20. The three-axis crash sensing system of claim 19, wherein the absolute value of the left and right acceleration thresholds are essentially the same.

21. The three-axis crash sensing system of claim 19, wherein the absolute value of the forward and aft acceleration thresholds are essentially the same.

22. The three-axis crash sensing system of claim 16, further comprising means for recording the detected accelerations for the predetermined time period.

23. The three-axis crash sensing system of claim 16, wherein the means for detecting forward, aft, up, down, left and right accelerations comprises unit-to-aircraft transformation coefficients.

24. The three-axis crash sensing system of claim 16, further comprising at least one additional safety device, which are electrically connected to the crash sensing units such that the additional safety devices are activated by the crash sensing unit when the crash sensing unit initiates ignition.

25. The three-axis sensing system of claim 24, wherein the at least one additional safety device is one of a flotation device and a restraint pretensioner.

26. The three-axis sensing system of claim 16, further comprising a remotely located occupant position sensor, wherein the microprocessor does not deploy the air bags based upon input from the remotely located occupant position sensor.

27. A three-axis aircraft crash sensing system comprising:
(a) an x-axis solid-state accelerometer;
(b) a y-axis solid-state accelerometer mounted orthogonally to the x-axis solid-state accelerometer;
(c) a z-axis solid-state accelerometer mounted orthogonally to the x-axis and y-axis solid-state accelerometers;

(d) a microprocessor and one or more ignition circuits;

(e) one or more air bags; and (f) one or more gas generators, each of said gas generators comprising an igniter, wherein each igniter is electrically connected to an ignition circuit, wherein said gas generators are capable of fully inflating all of the one or more air bags, wherein each of the accelerometers continuously measures acceleration in its respective direction, and provides signals representative of the acceleration to the microprocessor, wherein the microprocessor calculates an x-axis total velocity change, a y-axis total velocity change and a z-axis total velocity change from the signals representative of the acceleration, wherein the microprocessor contains an x-axis acceleration threshold, a y-axis acceleration threshold, and a z-axis acceleration threshold, wherein the microprocessor also contains an x-axis total velocity change threshold, a y-axis total velocity change threshold and a z-axis total velocity change threshold, wherein the microprocessor also contains an equation for calculating whether an acceleration criterion has been exceeded based upon the measured x-axis, y-axis and z-axis accelerations, and upon the x-axis, y-axis and z-axis acceleration thresholds, wherein the microprocessor also contains an equation for calculating whether a total velocity change criterion has been exceeded based upon the calculated x-axis, y-axis and z-axis total velocity changes, and upon the x-axis, y-axis and z-axis total velocity change thresholds, and wherein the microprocessor is programmed to issue a command to the ignition circuit to initiate ignition of one or more igniters if the acceleration criterion has been exceeded and the total velocity change criterion has been exceeded.

28. The three-axis aircraft crash sensing system of claim 27, wherein the equation for determining whether the acceleration criterion has been exceeded is:

$$\left(\frac{a_x}{a_x^{th}}\right)^{n_x} + \left(\frac{a_y}{a_y^{th}}\right)^{n_y} + \left(\frac{a_z}{a_z^{th}}\right)^{n_z} \geq 1.0$$

where $a_x$, $a_y$ and $a_z$ are the measured accelerations in the x, y and z directions, respectively;

$a_x^{th}$, $a_y^{th}$ and $a_z^{th}$ are the acceleration thresholds in the x, y and z directions, respectively; and $n_x$, $n_y$ and $n_z$ are pre-selected acceleration exponents in the x, y and z directions respectively.

29. The three-axis crash sensing system of claim 28, wherein the equation for determining whether the total velocity change criterion has been exceeded is:

$$\left(\frac{\Delta V_x}{\Delta V_x^{th}}\right)^{m_x} + \left(\frac{\Delta V_y}{\Delta V_y^{th}}\right)^{m_y} + \left(\frac{\Delta V_z}{\Delta V_z^{th}}\right)^{m_z} \geq 1.0$$

where $\Delta V_x$, $\Delta V_y$ and $\Delta V_z$ are the total velocity changes in the x, y and z directions, respectively;

$\Delta V_x^{th}$, $\Delta V_y^{th}$ and $\Delta V_z^{th}$ are the velocity change thresholds in the x, y and z directions, respectively; and $m_x$, $m_y$ and $m_z$ are velocity change exponents in the x, y and z directions, respectively.

30. The three-axis crash sensing system of claim 27, wherein the equation for determining whether the total velocity change criterion has been exceeded is:

$$\left(\frac{\Delta V_x}{\Delta V_x^{th}}\right)^{m_x} + \left(\frac{\Delta V_y}{\Delta V_y^{th}}\right)^{m_y} + \left(\frac{\Delta V_z}{\Delta V_z^{th}}\right)^{m_z} \geq 1.0$$

where $\Delta V_x$, $\Delta V_y$ and $\Delta V_z$ are the total velocity changes in the x, y and z directions, respectively;

$\Delta V_x^{th}$, $\Delta V_y^{th}$ and $\Delta V_z^{th}$ are the velocity change thresholds in the x, y and z directions, respectively; and $m_x$, $m_y$ and $m_z$ are velocity change exponents in the x, y and z directions, respectively.

31. The three-axis crash sensing system of claim 27, further comprising a flash RAM memory for recording time history data for each of the accelerometers for a predetermined period.

32. The three-axis crash sensing system of claim 27, wherein the acceleration and total velocity change thresholds are programmable.

33. A method for detecting crashes comprising:

(a) providing a programmable controller and three solid-state accelerometers which are mounted in mutually orthogonal directions;

(b) continually receiving three sets of signals at the programmable controller from each of the three orthogonally-mounted solid-state accelerometers, each one of said set of signals representing the acceleration respectively experienced by one of the three solid-state accelerometers;

(c) calculating whether an acceleration criterion has been exceeded based upon the measured x-axis, y-axis and z-axis accelerations, and upon x-axis, y-axis and z-axis acceleration thresholds, (d) returning to step (b) if the acceleration criterion has not been exceeded;

(e) initializing a counter for time and a counter for total velocity change for each of the accelerometers for which the respective acceleration threshold was exceeded, if the acceleration criterion has been exceeded;

(f) calculating the incremental velocity change for the x-direction, and incremental velocity change for the y-direction and an incremental velocity change for the z-direction;

(g) calculating the total velocity change for each of the x, y and z directions by adding the incremental velocity change to a sum of all previously calculated incremental velocity changes for that direction within a predetermined time period, if any;

(h) calculating whether a total velocity change criterion has been exceeded based upon the total velocity changes for the x, y and z directions, and also based upon total velocity change thresholds for the x, y and z directions;

(i) if the total velocity change criterion has been exceeded, igniting an ignition circuit which initiates generation of gas for inflating air bags; and (j) if the total velocity change criterion has not been exceeded, returning to step (b).

34. The method of claim 33, wherein the calculation of whether the acceleration criterion has been exceeded uses the following equation:

$$\left(\frac{a_x}{a_x^{th}}\right)^{n_x} + \left(\frac{a_y}{a_y^{th}}\right)^{n_y} + \left(\frac{a_z}{a_z^{th}}\right)^{n_z} \geq 1.0$$

where $a_x$, $a_y$ and $a_z$ are the measured accelerations in the x, y and z directions, respectively;

$a_x^{th}$, $a_y^{th}$ and $a_z^{th}$ are the acceleration thresholds in the x, y and z directions, respectively; and $n_x$, $n_y$ and $n_z$ are pre-selected acceleration exponents in the x, y and z directions respectively.

35. The method of claim 34, wherein the calculation of whether the total velocity change criterion has been exceeded uses the following equation:

$$\left(\frac{\Delta V_x}{\Delta V_x^{th}}\right)^{m_x} + \left(\frac{\Delta V_y}{\Delta V_y^{th}}\right)^{m_y} + \left(\frac{\Delta V_z}{\Delta V_z^{th}}\right)^{m_z} \geq 1.0$$

$\Delta V_x$, $\Delta V_y$ and $\Delta V_z$ are the total velocity changes in the x, y and z directions, respectively;

$\Delta V_x^{th}$, $\Delta V_y^{th}$ and $\Delta V_z^{th}$ are the velocity change thresholds in the x, y and z directions, respectively; and $m_x$, $m_y$ and $m_z$ are velocity change exponents in the x, y and z directions, respectively.

36. The method of claim 33, wherein the calculation of whether the total velocity change criterion has been exceeded uses the following equation:

$$\left(\frac{\Delta V_x}{\Delta V_x^{th}}\right)^{m_x} + \left(\frac{\Delta V_y}{\Delta V_y^{th}}\right)^{m_y} + \left(\frac{\Delta V_z}{\Delta V_z^{th}}\right)^{m_z} \geq 1.0$$

where $\Delta V_x$, $\Delta V_y$ and $\Delta V_z$ are the total velocity changes in the x, y and z directions, respectively;

$\Delta V_x^{th}$, $\Delta V_y^{th}$ and $\Delta V_z^{th}$ are the velocity change thresholds in the x, y and z directions, respectively; and $m_x$, $m_y$ and $m_z$ are velocity change exponents in the x, y and z directions, respectively.

37. The method of claim 33, further comprising recording time history data for each of the accelerometers for the predetermined time period.

38. The method of claim 33, further comprising the following additional steps between steps (h) and (i):

calculating the time each of the accelerometers has been experiencing acceleration greater than its respective threshold acceleration as an event time, comparing the event time to a predetermined time limit for each of the accelerometers, if the event time is not greater than the predetermined time limit for any of the accelerometers, returning to step (b), if the event time is greater than the predetermined time limit, going on to step (i).

39. The method of claim 33, further comprising, the following additional steps between steps (g) and (h):

calculating the time each of the accelerometers has been experiencing acceleration greater than its respective threshold acceleration as an event time, comparing the event time to a predetermined time window for each of the accelerometers, if the event time is greater than the predetermined time window for all of the accelerometers, going on to step (h), if the event time is not greater than the predetermined time window, determining whether the acceleration criterion was exceeded in a time window just prior to the present time window, if the respective acceleration criterion was not exceeded in the time window just prior to the present time window, returning to step (b), if the respective acceleration criterion was exceeded in the time window prior to the present time window, going on to step (h).

40. The method of claim 33, further comprising recording and retaining in memory the number of aircraft start-ups occurring after any one of the three acceleration thresholds has been exceeded.

\* \* \* \* \*

UNITED STATES PATENT AND TRADEMARK OFFICE
CERTIFICATE OF CORRECTION

| | |
|---|---|
| PATENT NO. | : 5,928,300 |
| DATED | : July 27, 1999 |
| INVENTOR(S) | : Rogers et al. |

It is certified that error appears in the above-identified patent and that said Letters Patent is hereby corrected as shown below:

Column 1,
Line 3, after "BACKGROUND" insert -- The present invention was conceived and reduced to pratice under U.S Army Contract DAA J02-94-C-0025.--

Signed and Sealed this

Twenty-eighth Day of August, 2001

Attest:

NICHOLAS P. GODICI
Attesting Officer *Acting Director of the United States Patent and Trademark Office*